United States Patent [19]

Hirotomi

[11] Patent Number: 4,873,477

[45] Date of Patent: Oct. 10, 1989

[54] DRIVING CIRCUIT FOR ACTUATOR

[75] Inventor: Jun Hirotomi, Tokyo, Japan

[73] Assignee: Seiko Instruments Inc., Japan

[21] Appl. No.: 239,537

[22] Filed: Sep. 1, 1988

[30] Foreign Application Priority Data

Sep. 8, 1987 [JP] Japan .................................. 62-224849

[51] Int. Cl.$^4$ ............................................. G05B 1/06
[52] U.S. Cl. .................................... 318/603; 318/608; 318/618
[58] Field of Search ............... 318/560, 562, 568, 569, 318/592, 593, 504, 595, 599, 600, 601, 602, 603, 615, 616, 617, 618, 626, 628, 636, 571, 573, 574, 341, 561, 434; 364/474.34

[56] References Cited

U.S. PATENT DOCUMENTS

| | | | |
|---|---|---|---|
| 3,684,874 | 8/1972 | Kelling | 364/474.34 X |
| 3,708,657 | 1/1973 | Kelling | 318/608 X |
| 3,889,105 | 6/1975 | Schneckloth | 318/603 X |
| 3,911,346 | 10/1975 | Schneckloth | 318/603 X |
| 3,967,177 | 6/1976 | Scholten et al. | 318/603 |
| 4,170,751 | 10/1979 | Stricker | 318/603 X |
| 4,529,922 | 7/1985 | Ono | 318/603 |

Primary Examiner—William M. Shoop, Jr.
Assistant Examiner—Paul Ip
Attorney, Agent, or Firm—Bruce L. Adams; Van C. Wilks

[57] ABSTRACT

The actuator has a displacement detector and is driven intermittently through a given displacement. A mean amount of drive signals per one intermittent drive such as a mean duration of drive signals and a mean number of drive pulse signals is calculated through a predetermined number of intermittent drives. The mean amount of drive signals is intermittently applied to the actuator for a given number of intermittent drives without the displacement detection. After the given number of intermittent drives by the calculated mean amount, another intermittent drive with the displacement detection is carried out. At this time, the total duration of the drive pulse signals or number of the drive pulse signals outputted until the completion of the given displacement is compared with the calculated mean amount. If the difference therebetween is greater than a given value, the number of intermittent drives by the mean amount is reduced, or if the difference is much greater, the predetermined number of intermittent drives are carried out once again to calculate an updated mean amount. On the other hand, the difference is smaller than the given value, the number of intermittent drives by the mean amount is increased.

4 Claims, 7 Drawing Sheets

DRIVING CIRCUIT FOR ACTUATOR

BACKGROUND OF THE INVENTION

1. Field of the Invention

The present invention relates to an actuator having a displacement detector, more specifically, relates to an actuator in which the displacement detection needs great power consumption, or a number of positions for the displacement detection is limited.

2. Description of the Prior Art

The displacement of position detectors for use in the actuator utilize a change of light, magnetism and electrostatic capacity and a mechanical contact. These various types of detectors can be selected for proper use. In the conventional actuator, the displacement detection is successively carried out for every intermittent drive.

The displacement or position detection consumes almost all amount of assigned power for the act of the detection. For example, as shown in FIG. 9, a photodetector is comprised of an Si photo-diode 903 as a light source which consumes about 10–20 mW. If the power supply is comprised of a small battery such as a silver battery of button type (capacity 20–100 mWh) and lithium battery of button type (capacity 50–300 mWh), the life of the power supply is shortened due to the successive detection of the displacement.

In a rotary actuator, a detection disc 902 is divided into a given number of angular sections for the successive detection of the angular displacement during the intermittent drives. The detection disc 902 has the given number of slits in case of the photo-detection or the given number of patterns in case of the mechanical contact detection. The provision of slits and patterns needs a space and fabrication cost.

SUMMARY OF THE INVENTION

It is therefore an object of the present invention to control the period of the displacement detection in an intermittently drivable actuator having a displacement or position detector so as to reduce power consumption needed for the displacement detection without an accumulated displacement error.

It is another object of the present invention to reduce a number of slits, patterns and magnets needed for the detection in a multi-divided and intermittently drivable actuator.

In order to achieve these and other object, according to the present invention, the actuator has a controller to for control a drive mode thereof so as to enable the intermittent drive thereof without successive detection of displacement and displacement error. The inventive actuator is selectively operated in a first drive mode in which a mean duration or mean pulse number of drive pulse signals per one intermittent drive is calculated during a given number of intermittent drives, a second drive mode in which the drive pulse signals having the calculated mean duration or mean pulse number are successively applied to the actuator for a predetermined number of intermittent drives and a third drive mode in which the actuator is driven intermittently one time with the detection of the displacement and the duration or pulse number of the drive signals at this time is compared with the calculated means duration or mean pulse number to calculate the difference therebetween. The controller controls the drive mode according to the calculated difference.

According to the above described structure, the actuator having the displacement detector is driven intermittently through a given displacement which is determined by the displacement detection each time for the first given number of intermittent drives to thereby calculate the mean drive duration or mean drive pulse number per one intermittent drive. Thereafter, the actuator is intermittently driven according to the calculated mean value without successive displacement or position detection and a great error of displacement.

Further, in the third drive mode, after the intermittent drives according to the calculated mean value, another intermittent drive is carried out with the detection to thereby count the drive duration on the drive pulse number at that time. The difference between the counted valve and the calculated mean value is calculated to determine whether a new mean value should be calculated on the calculated mean value should be maintained. For example, in a rotary actuator angularly intermittently driven through one rotation, the rotary actuator can be driven in the third drive mode once for one complete rotation to thereby effect correction each one complete rotation.

DETAIL DESCRIPTION OF THE PREFERRED EMBODIMENTS

Figure 1:
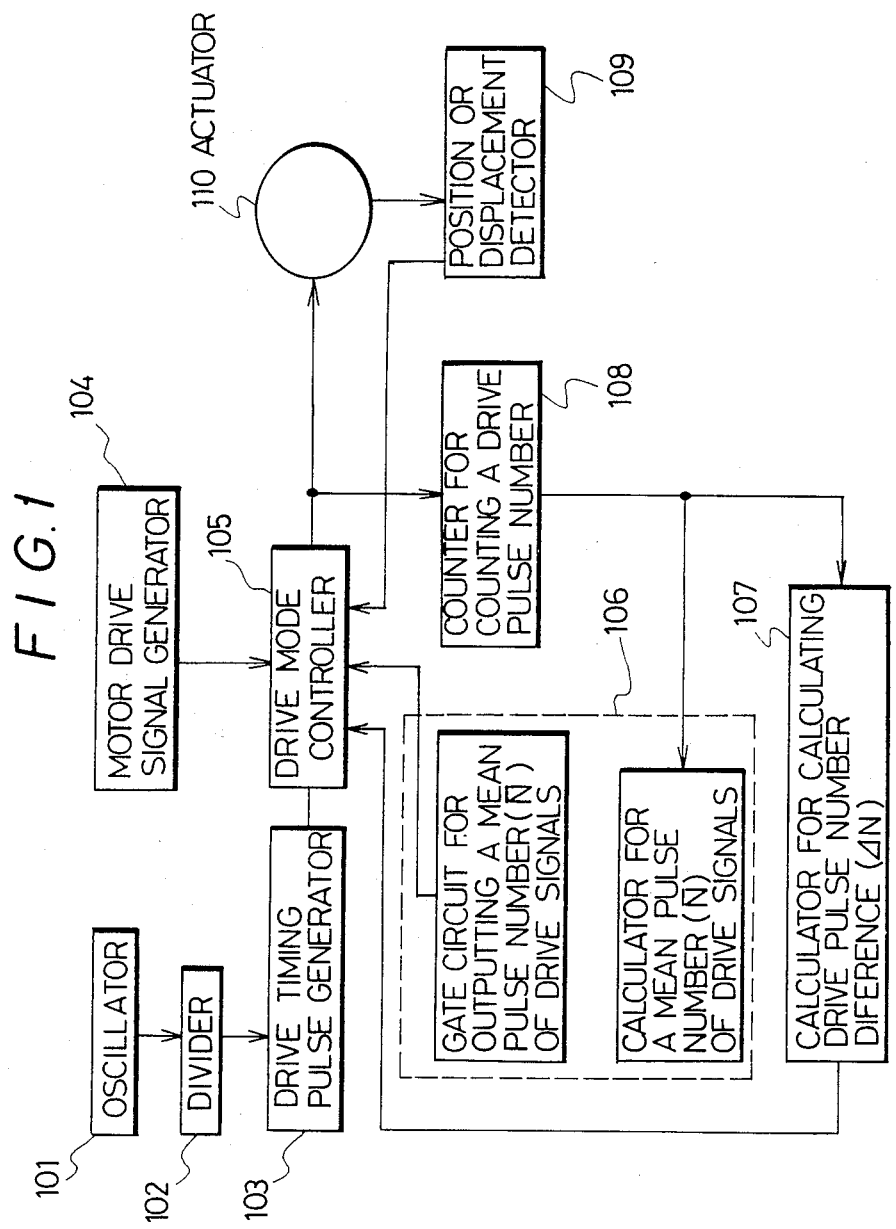
FIG. 1 is a block diagram showing a circuit structure of a typical embodiment according to the present invention.

Hereinafter, embodiments of the present invention will be explained in conjunction with the drawings. FIG. 1 is a functional block diagram showing a typical embodiment of the invention.

An oscillator 101 feeds a standard clock signal to a frequency divider 102. A timing circuit 103 generates and outputs a timing pulse signal, in response to the output of the frequency divider 102, effective to initiate each intermittent drive. A controller 105 applies motor drive signals to an actuator 110 according to a selected drive mode in response to each timing pulse signal. In a first drive mode, a setting circuit 106 calculates a mean amount of the drive signals per one intermittent drive according to count data of a counter 108 which counts a number of drive pulse signals applied to the actuator 110 each intermittent drive so as to set a drive condition. In a second drive mode, the setting circuit 106 outputs a gate signal to produce a set of drive pulse signals having the mean amount calculated in the first drive mode. Further, in a third drive mode, a difference calculating circuit 107 calculates a difference between the count data obtained in the counter 108 and the mean amount to thereby outputs the difference to the controller 105 to detect or monitor a drive state of the actuator 110. The controller 105 controls and selects the drive modes based on the difference or the drive state fed from the difference calculating circuit 107.

Next, the first drive mode is explained, in which a mean drive duration or mean drive pulse number per one intermittent drive is calculated by counting a drive duration or drive pulse number until each completion of the displacement detection during a given number of intermittent drives.

Figure 2:
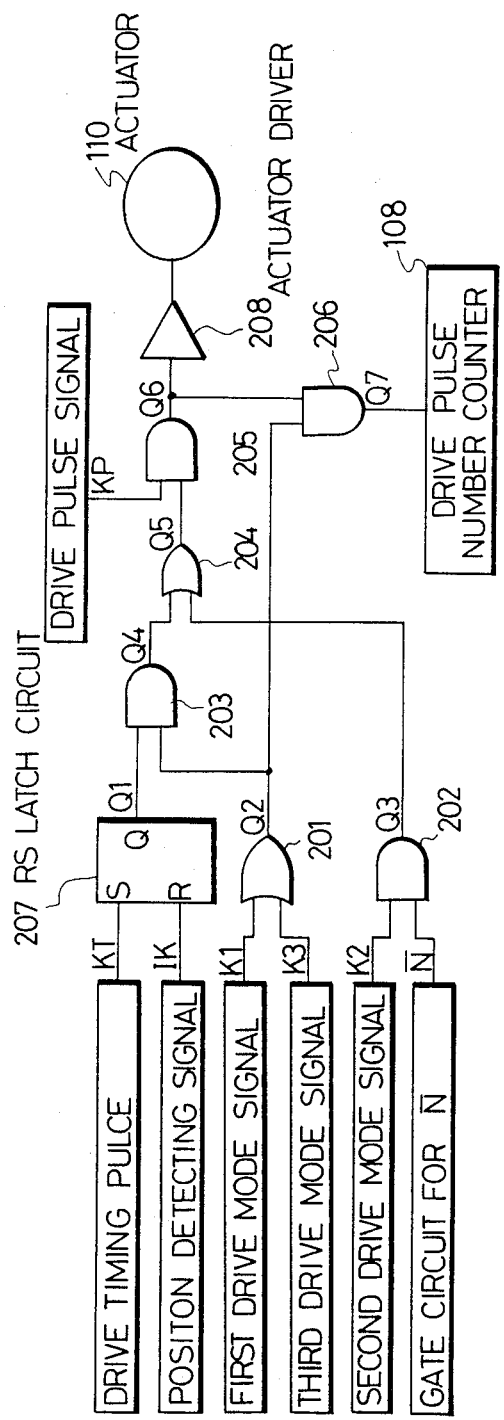
FIG. 2 is a circuit block diagram showing a circuit of a drive mode controller in FIG. 1.

FIG. 2 is a circuit block diagram showing a simple embodiment for controlling the drive state of the actuator. At the initial stage, a first drive mode signal K1 is held in a signal level "H", and a second drive mode signal K2 and third drive mode signal K3 are held in a signal level "L". Since the second drive mode signal K2 is held in "L", an output of an AND gate 202 is held in "L" so that an OR gate 204 is not activated by the AND gate 202. An AND gate 205 for controlling drive signals is controlled by an output Q4 of an AND gate 203 which receives an output Q1 of an RS latch circuit 207 and an output Q2 of an OR gate 201 which receives the first drive mode signal K1.

Figure 3:
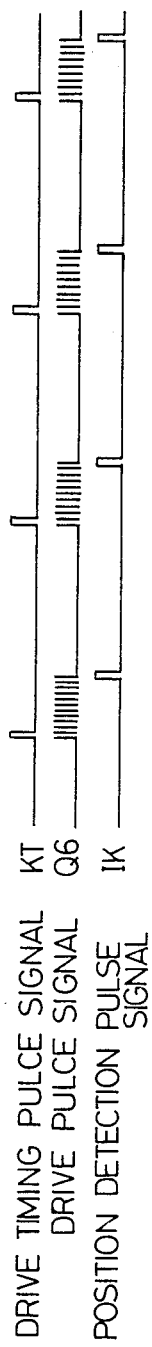
FIG. 3 is a time chart showing timing relation between a drive timing signal, a drive signal and a displacement detection signal in a first drive mode.

FIG. 3 shows a timing chart of the drive timing pulse signal KT, drive pulse signals KP and a displacement or position detection signal 1K during the operation in the first mode.

When the timing pulse signal KT is held in "H" level, the output Q1 of the RS latch circuit is made "H" level so that the drive pulse signals KP are applied to an actuator driver 208 so as to drive the actuator 110. During the drive, when the position or displacement detection signal 1K indicative of the completion of the given displacement of the actuator at one intermittent drive is inputted into a reset terminal of the RS latch circuit 207, the Q1 is turned to "L" level and the AND gate 205 is turned OFF so that the signal KP is blocked from the actuator. At this time, the counter 108 counts the drive signals KP (For example, a number of pulses) applied to the actuator. The above described operation is repeated for given times. The total of the counted pulse numbers is divided by the given times to obtain a mean pulse number $\overline{N}$ or mean drive duration per one intermittent drive in the first drive mode. The actuator is driven in the first mode for the given times, and after this, the first drive mode signal K1 is turned to "L" level and the second drive mode signal K2 is turned to "H" level so that the mean number $\overline{N}$ of the drive pulses are applied to the actuator for each intermittent drive without the position or displacement detection. At this time, an additional power is saved since the position detection is suspended.

In general, an actuator effects variable displacement due to variation of load even if the level or intensity of the drive signals is kept constant. For example, a DC motor and an ultrasonic wave motor are typical motors of this type.

If the actuator were driven only in the second drive mode, the position of the actuator could be deviated during the intermittent drives due to the variation of the load and so on. Therefore, according to the present invention, in order to solve the above mentioned problem, the actuator is driven in the third drive mode as described below.

After the drives of the actuator in the second drive mode for the given times, the third drive mode signal K3 is turned to "H" level (of course, at this time, the first and second drive mode signals K1 and K2 are held in "L" level). By such operation, the actuator is driven another time with the position detection operation so as to count the drive duration or the drive pulse number N' of the drive signals KP as sampling data. Then, the difference $\Delta N$ ($= 1\overline{N} - N'1$) is calculated. If $\Delta N$ is greater than a predetermined value, $\overline{N}$ is updated by repeating the first drive mode. If $\Delta N$ is smaller than the predetermined value, the second drive mode is maintained with the same mean value $\overline{N}$. If $\Delta N$ is much smaller, the number of intermittent drives utilizing the mean value $\overline{N}$ is increased. This mode selection is carried out according to the result of the sampling in the third mode so as to correct the displacement deviation of the actuator periodically.

Figure 4:
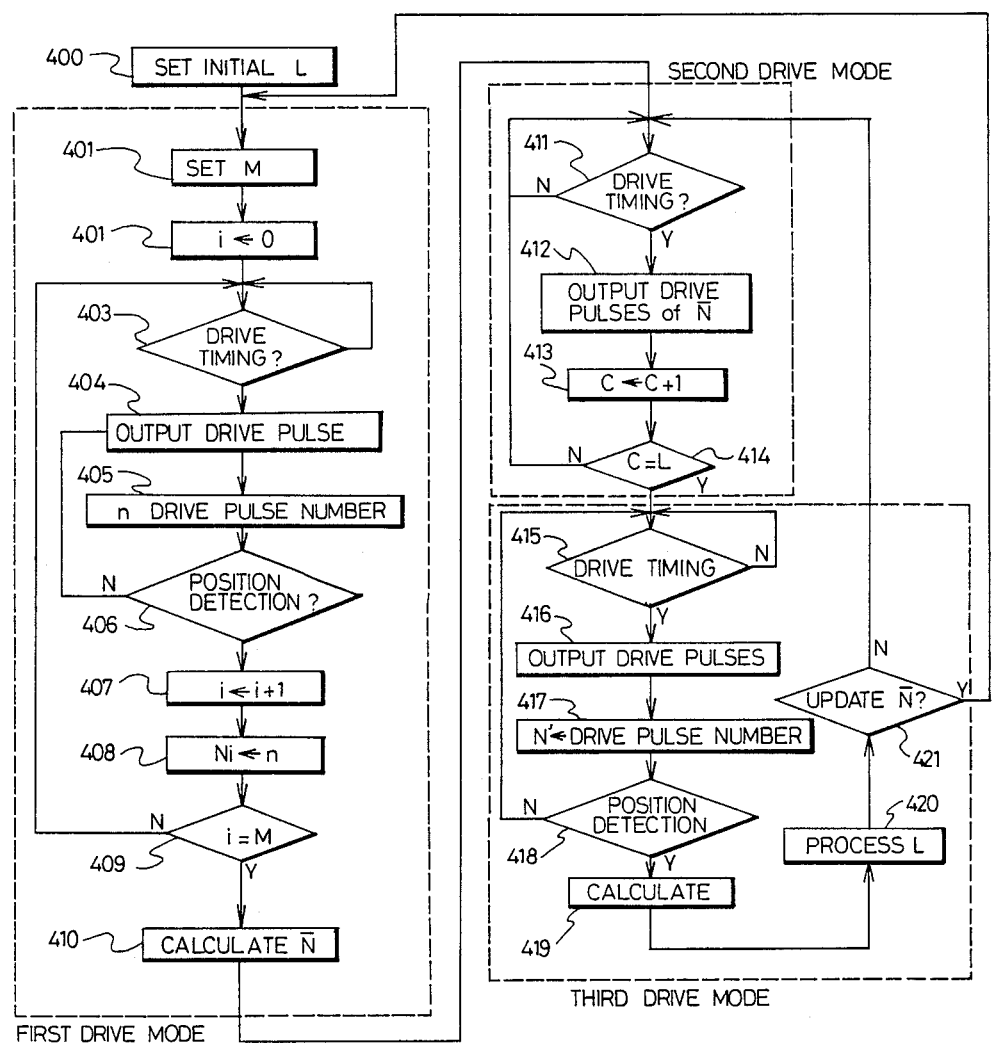
FIG. 4 is a flow chart showing the operation of the present invention.

FIG. 4 is a flow chart showing the above described operation. In FIG. 4, an integer M in process step 401 represents a given number of intermittent drives in the first drive mode for calculating a mean amount $\overline{N}$ of drive signals per one intermittent drive. Namely, $\overline{N}$ is determined according to the following relation:

$$N = \left( \sum_{i=1}^{M} N_i \right) / M$$

where $N_i$ is an amount of drive signals needed to drive the actuator once. The process steps 401–410 are carried out in the first drive mode. An integer number L in process step 400 represents a number of intermittent drives in the second drive mode where the actuator is driven intermittently according to the mean amount $\overline{N}$ of drive signals calculated in the first drive mode. The steps 411–414 of the flow chart are carried out in the second drive mode.

When the number of intermittent drives in the second drive mode reaches the set number L, the third drive mode is selected. In this mode, a difference $\Delta N$ between $\overline{N}$ and N' which represents a counted amount of drive signals applied to the actuator in another intermittent drive until the completion of the given displacement. According to the value of $\Delta N$, it is determined whether the number L should be increased or decreased. Further, $\Delta N$ is smaller than a predetermined value, the calculation to update $\overline{N}$ is suspended and the third drive mode is switched to the second drive mode. Steps 415–421 of the flow chart are carried out in the third drive mode.

Figure 5:
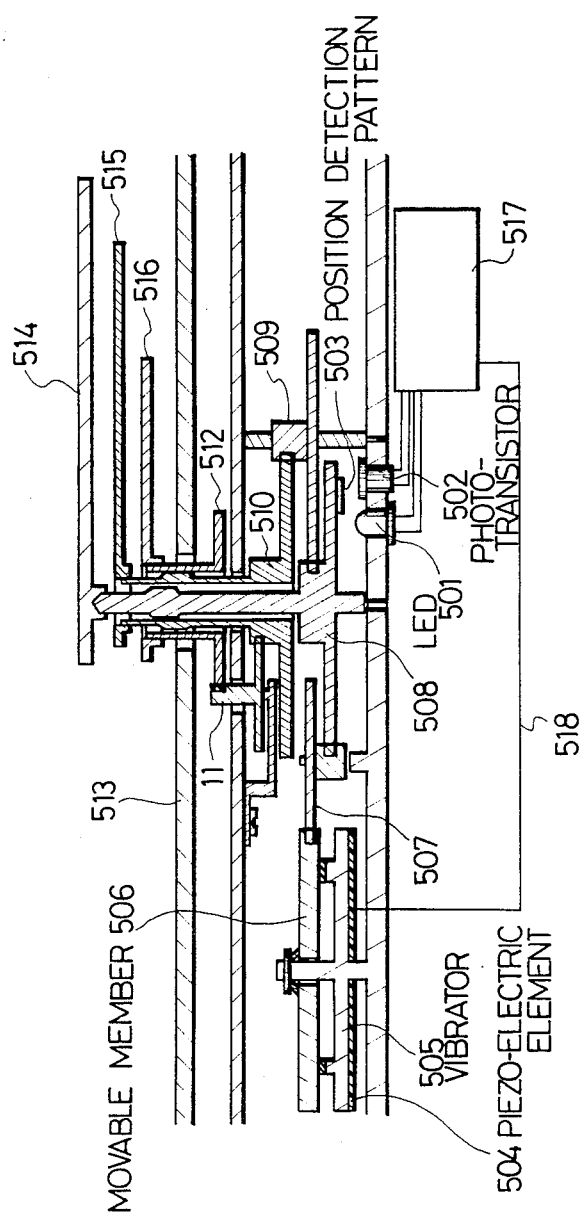
FIG. 5 is a sectional view of an analog timepiece having a supersonic wave motor as a drive source and a light-emitting diode and photo-transistor as a position detector.

FIG. 5 is a diagram showing an embodiment of timepiece having a supersonic wave motor according to the present invention. The supersonic wave motor is comprised of a vibrating plate 505 (such as a metal plate), piezo-electric element 504 attached to the vibrating plate 505 in the polarized arrangement so as to generate a progressive wave, and a movable member 506 disposed in contact with the vibrating plate 505 so as to undergo frictional displacement. This motor has a variable displacement due to the frictional drive depending on the load and contact state between the vibrating plate 505 and the movable member 506 even when the constant number of drive pulse signals is applied to the motor each intermittent drive. If such a motor were utilized as a drive source of a timepiece having hour, minute and second hands without the application of the present invention, sixty times of position detections would be needed for each one round rotation of the second hand. Further, the power consumption for the position detector such as a photo-detector would not be negligible if a small battery were utilized as a power source. In such a case, according to the present invention, the power consumption for the position detection could be greatly reduced.

Figure 6:
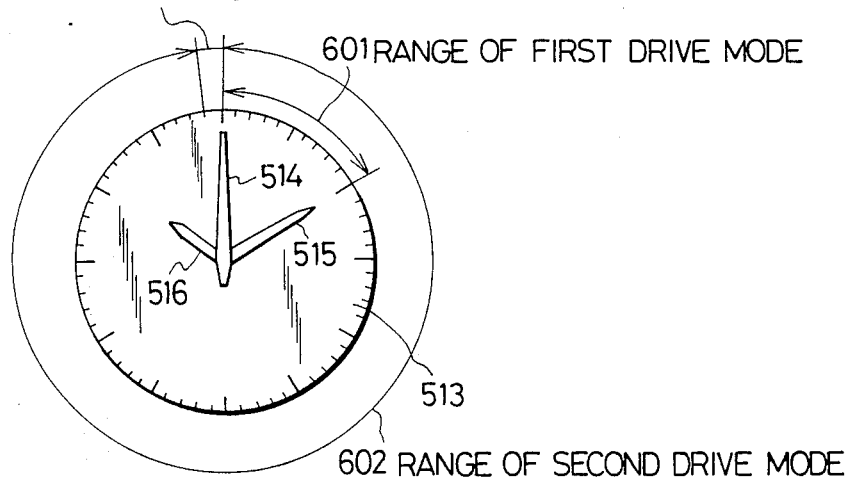
FIG. 6 is an explanatory diagram showing drive ranges through which an actuator is driven in first, second and third modes.

As shown in FIG. 6, according to the invention, the motor is firstly driven in the first drive mode through a range 601 from 0 second to 10 second where the position of displacement detection is carried out each intermittent drive of the second hand so as to calculate a mean pulse number $\overline{N}$ of the drive signals per second. Next, the motor is driven in the second drive mode through another range from 11 second to 59 second where the motor receives $\overline{N}$ number of drive signals each second. In further range 603 from 59 second to 0 second, the motor is driven in the third drive mode to count a drive pulse number N' until the completion of the second hand displacement from 59 second to 0 second. N' and $\overline{N}$ are compared with each other to determine if $\overline{N}$ should be updated or not. If the motor is driven as it is in the next round rotation according to the second drive mode, the combined range 602 from 0 second to 59 second becomes the range through which the motor is driven according to the second drive mode, since the position detection is suspended also in the range from 0 second to 10 second.

Figure 7:
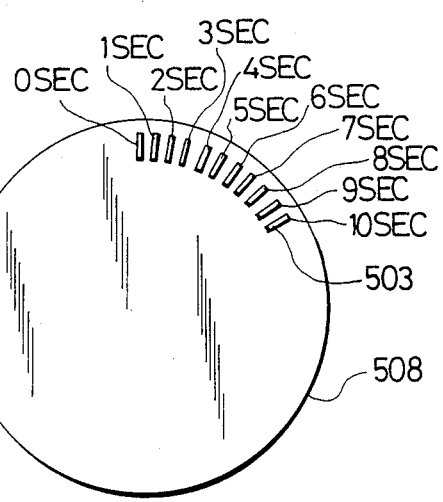
FIG. 7 is an explanatory view of a second wheel of FIG. 5 provided with a pattern for use in the position detection.

FIG. 7 is a diagram showing a second wheel 508 in which mark patterns used for the position detection is provided only on a part of the circumference of wheel 508.

Figure 8:
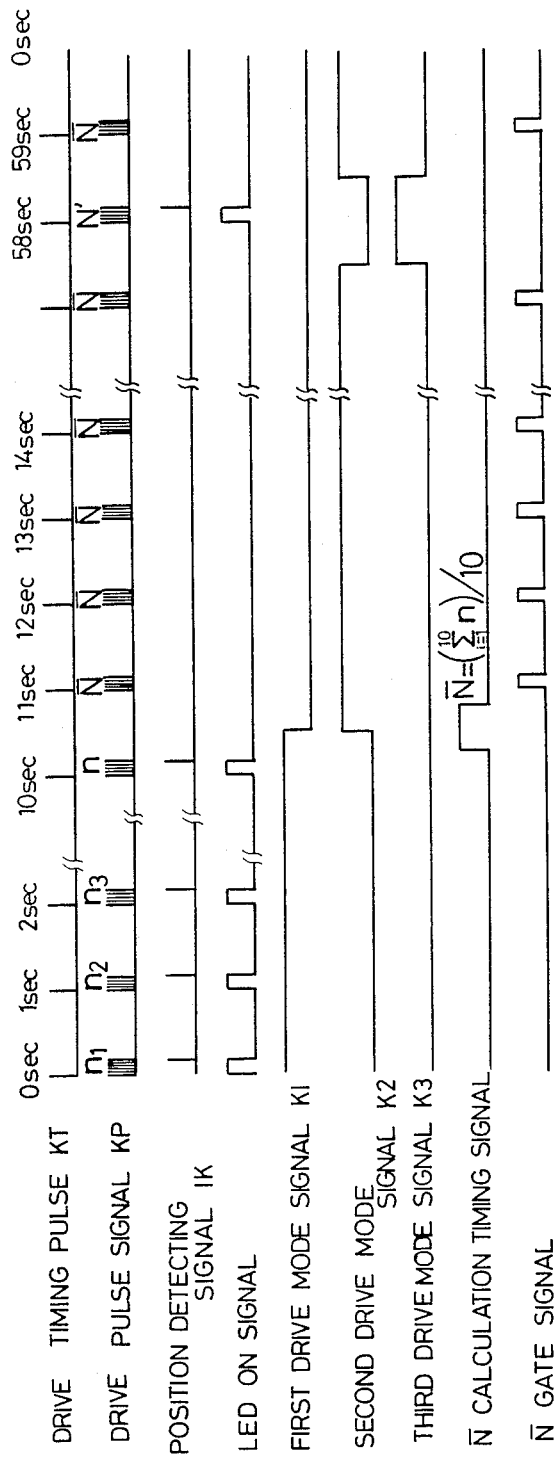
FIG. 8 is a time chart showing timing relation between the position detection and the intermittent drive in the analog timepiece shown in FIG. 5.
Figure 9:
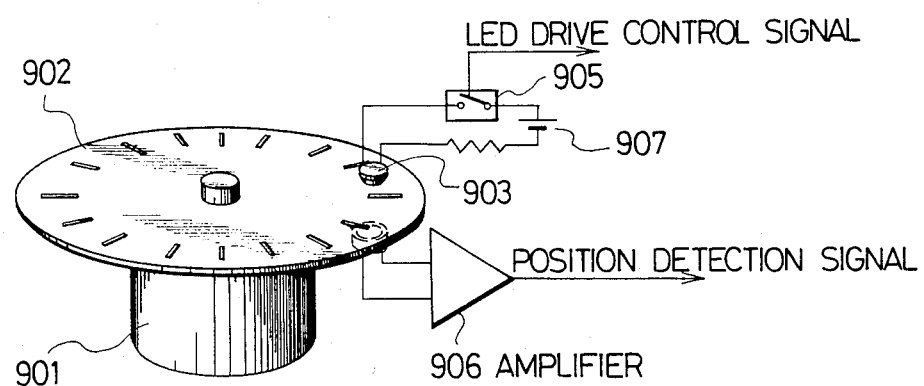
FIG. 9 is a perspective view showing a position detector comprised of a light-emitting diode and a photo-transistor.

FIG. 8 is a timing chart showing timing relation of position detection and intermittent drive in the analog timepiece shown in FIG. 5 according to the present invention. In the first drive mode during the interval from 0 second to 10 second, the position detection is carried out in response to the application of the drive timing pulse signal KP. After the drive at 10 second, $\overline{N}$ is calculated. Next, the actuator is driven according to the calculated amount $\overline{N}$ of drive pulse signals in the second drive mode through 59 second. During the drive from 59 second to 0 second, the actuator is driven in the third drive mode with the position detection. At this time, the amount N' of drive signals is counted to calculate $\Delta N(\overline{N}-N')$. According to the value of $\Delta N$, it is determined whether the first drive mode should be carried out or the second drive mode should be maintained. In the figure, $\Delta N$ is small so that the actuator is driven in the second drive mode after 0 second for another round rotation.

According to the present invention, in the actuator having a displacement or position detector which consumes a great amount of power or which cannot be provided with a great number of position detection marks, the position detection is carried out several times for the initial drives to calculate a mean amount of the drive signals per one intermittent drive. Thereafter, the actuator is intermittently driven according to the mean amount without the position detection so that the power which would be consumed by the position detection can be effectively saved. Moreover, the position detection marks are needed only a few so that, in case of the rotary type actuator, it is not necessary to provide detection marks all around the rotary type actuator.

What is claimed is:

1. In an actuator drivable to intermittently move through a given displacement, a drive circuit for driving the actuator comprising: oscillator means for generating a clock signal; divider means for frequency-dividing the clock signal; timing means for producing a drive timing signal effective to time the drive of the actuator in response to the frequency-divided clock signal; displacement detecting means for detecting the given displacement of the actuator; counting means for counting an amount of drive signals applied to the actuator during each intermittent drive thereof; setting means for setting a drive condition of the actuator according to counted data from the counting means; drive detecting means for detecting a drive state of the actuator; and controller means for selecting a plurality of drive modes of the actuator according to the set drive condition and detected drive state to thereby control the drive of the actuator.

2. An actuator according to claim 1; wherein the setting means comprises adding means for adding the counted data to store the added data, calculating means for calculating a mean amount of the drive signals needed for one intermittent drive of the actuator based on the stored data, and gate means connected to the calculating means for producing a gate signal effective to output the mean amount of the drive signals to thereby set the drive condition.

3. An actuator according to claim 2; wherein the drive detecting means includes difference calculating means for calculating a difference between the mean amount of the drive signals and a sample amount of the drive signals applied to the actuator in response to a drive timing signal until the detection of the given displacement to thereby detect the drive state of the actuator.

4. An actuator according to claim 3; wherein the controller means includes selecting means for selecting a first mode in which the mean amount of the drive signals is calculated during intermittent drives of the actuator, a second mode in which the mean amount of the drive signals is successively applied to the actuator for a predetermined number of intermittent drives of the actuator, and a third mode in which the difference between the mean amount of the drive signals and a sample amount of the drive signals applied to the actuator until the detection of the given displacement is calculated after the predetermined number of intermittent drives.

* * * * *